H. H. STEELE.
TYPE WRITING MACHINE.
APPLICATION FILED OCT. 18, 1910.
979,717.
Patented Dec. 27, 1910.
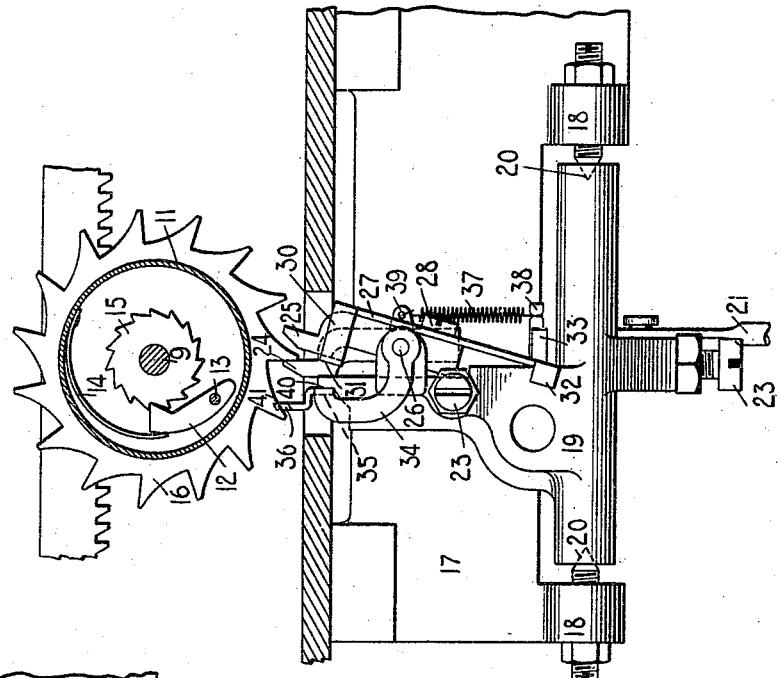
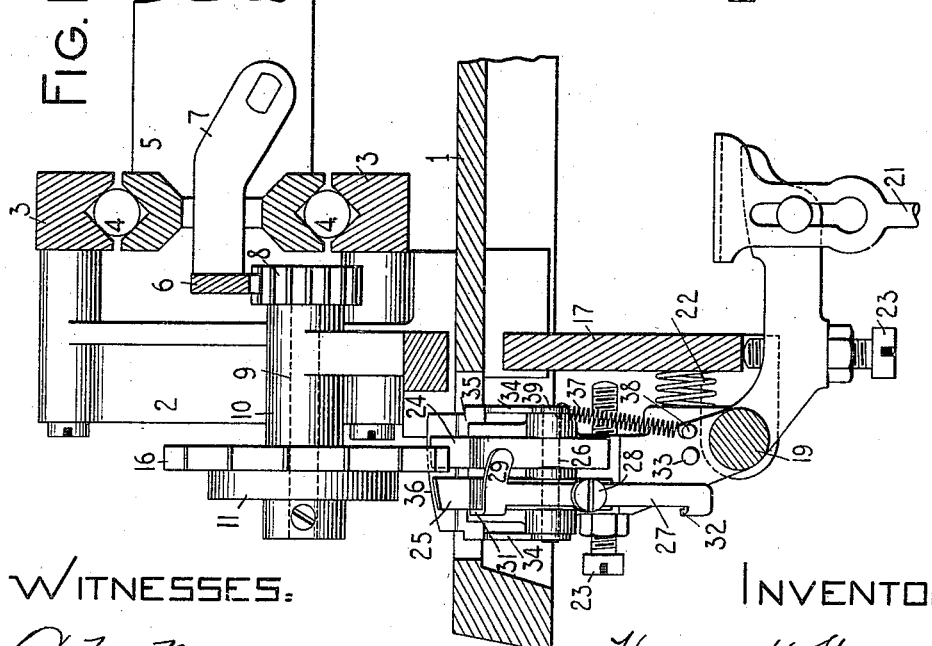
WITNESSES:
INVENTOR:
Herbert H. Steele
By Jacob Felbel
HIS ATTORNEY

UNITED STATES PATENT OFFICE.

HERBERT H. STEELE, OF MARCELLUS, NEW YORK, ASSIGNOR TO THE MONARCH TYPEWRITER COMPANY, OF SYRACUSE, NEW YORK, A CORPORATION OF NEW YORK.

TYPE-WRITING MACHINE.

979,717.  Specification of Letters Patent.  Patented Dec. 27, 1910.

Application filed October 18, 1910.  Serial No. 587,704.

*To all whom it may concern:*

Be it known that I, HERBERT H. STEELE, citizen of the United States, and resident of Marcellus, in the county of Onondaga and State of New York, have invented certain new and useful Improvements in Type-Writing Machines, of which the following is a specification.

My invention relates to typewriting machines and more particularly to the carriage feed mechanism of such machines.

My invention has for its principal object to provide an improved means for preventing backward motion of the escapement rack when said rack is relieved of the pressure of the carriage spring.

The specific form of my invention shown in the drawing may be regarded as in the nature of an improvement on the escapement mechanism described in the patent to E. E. Barney, No. 872,552, dated December 3rd, 1907; but the invention may also be adapted to other styles of feed mechanism. In said Barney patent there is shown an escapement wheel and coöperating with said wheel are two dogs, the forward one of which is normally in engagement with the wheel and said forward dog carries an arm with a stop device thereon adapted to engage a rack tooth in advance of the one engaged by the dog for the purpose of preventing the escapement wheel from going backward when the carriage is drawn toward the right. The escapement shown in said patent has been extensively used and successfully so but it is subject to a trouble which, though unusual, does sometimes occur in very rapid or erratic operation of the machine. This trouble is due to the fact that under certain spasmodic operations the stopping device referred to may strike against the forward surface of the oncoming rack tooth and thus momentarily check the return motion of the dog rocker with the result that the letter spacing is imperfect. This fault was corrected in the escapement shown in my prior Patent No. 914,081, dated March 2, 1909. In that patent the pawl which prevents the backward turning of the wheel is pivoted to the dog rocker to swing in a plane perpendicular to that of the wheel and this dog is adapted to yield in case it strikes the forward face of the tooth and the dog therefore does not interfere with the prompt restora-
tion of the dog rocker to normal position.
This dog or pawl, however, required a specially cut escapement wheel with a series of slots, in one of which the pawl must fit without any unnecessary lost space. This close fitting feature between the pawl and its slots introduced an element of uncertainty under very rapid manipulation as the pawl sometimes would not have sufficient time to enter the slot after printing the last letter of a line before the carriage might be thrown to the right hand, this being due to the closeness of the fit between the slot and the pawl. By the present invention I have obviated both of the difficulties referred to by simple and efficient means.

In the accompanying drawings, Figure 1 is a fore and aft vertical sectional view, and Fig. 2 is a rear elevation, partly in section, of the escapement mechanism of a typewriting machine having my invention embodied therein, both figures showing also some of the connected parts. Both figures are on an enlarged scale.

The invention is here shown applied to a Monarch typewriter which, in all other respects, may be of the usual construction and, as far as my invention is concerned, most of the parts may be of any ordinary or suitable construction. The Monarch machine has a top plate 1 from which rise standards 2 supporting stationary rails 3 which, through antifriction rollers 4, support a carriage 5. This carriage has a feed rack 6 pivoted thereto on arms 7 and meshing with a feed pinion 8 which is rigid with a shaft 9 journaled in a bracket 10 mounted on the top plate. At its rear end the shaft 9 has rigidly secured thereon a drum or housing 11 in which a pawl 12 is pivoted on a pin 13. A spring 14 presses said pawl into engagement with a ratchet wheel 15 secured to the rear face of an escapement wheel 16 which is mounted on the shaft 9 with freedom to turn relatively to said shaft except as prevented by the pawl 12.

A bracket 17 depending from the top plate 1 has ears 18 in which a dog rocker 19 is pivoted on pivots 20. The dog rocker is oscillated by a link 21 and returning spring 22, and its motion is limited by stop screws 23 in the usual manner. The upper part of said dog rocker is formed with two vertical slots in which are respectively pivoted the front dog 24 and the rear dog 25, the former being normally in engagement with the escapement wheel, as shown. Both of these dogs are pivoted on a horizontal pin 26 and each of them is adapted to turn about said pin as a center. When one of the dogs is engaged by the escapement said dog screws 23 in the usual manner. The upper part of said dog rocker is formed with two vertical slots in which are respectively pivoted the front dog 24 and the rear dog 25, the former being normally in engagement with the escapement wheel, as shown. Both of these dogs are pivoted on a horizontal pin 26 and each of them is adapted to turn about said pin as a center. When one of the dogs is engaged by the escapement wheel, it is pressed by said wheel toward the left in Fig. 2 until arrested by the upper part of the dog striking against the upper part of the dog rocker; and when one of the dogs is free of the wheel it is pressed back toward the right in Fig. 2 by a spring (not shown) until the depending tail of the dog strikes against the face of the dog rocker. The dog 25 has pivoted to the tail thereof a switching or reversing device consisting of a lever 27 mounted on a screw 28 and having at its upper end a branch 29 which, when the switching device is in the position shown in Fig. 1, overlies the forward dog 24. At its upper end said switching device also has a branch 30, of U-shape, bent around in such a way that when the switching device is in the position shown, the end part 31 (Fig. 2) of said branch lies to the left of the dog 25, as shown in Fig. 2 and between said dog and the part of the dog rocker that arrests the left-hand motion of said dog. The lower arm of the device 27 has bent therefrom an ear 32. A pin 33 projects from the dog rocker in such a position that the lower end of the device 27 can be pulled toward the right in Fig. 2 by hand and then moved toward the front of the machine when it will lie over the top or end of said pin.

When the switching device stands in the position shown in the drawing, the escapement is adapted to give a "reverse" feed; that is to say, it is adapted to allow the carriage to step upon the down stroke of the printing key or the space key; whereas if the switching device be moved to the position described with its lower end over the pin 33, then the escapement is set for an "ordinary" feed; that is to say, it is set to afford a let-off on the upstroke of the key. It is not deemed necessary to describe this escapement more minutely because, as far as has been described, it is or may be identical with that set forth in the Barney patent above referred to. It differs from the escapement set forth in said patent, however, in that in said patent an arm projects from the dog 25 and said arm has a stop on it to prevent the backward rotation of the escapement wheel; and said arm and stop are omitted from the present construction. I also make the pin 26 a little longer so that it projects from the dog rocker both in front and behind; and on the projecting ends of said pin I pivot two arms 34 which, as here shown, are made of sheet metal and made integral with a cross bar 35 which connects said arms at their upper ends, this entire piece of sheet metal therefore constituting a sort of inverted U-shaped device or yoke frame, the arms of which are pivoted at their lower ends on the pin 26. It will be seen that this cross bar extends in a front and back direction and that it lies at the left of the dogs 24 and 25, as viewed in Fig. 2. Said plate or cross bar is suitably bent as shown to bring its upper edge into engagement with the reverse side of that tooth of the escapement wheel 16 which has last escaped from the dogs 24 and 25, so that this device constitutes a pawl to prevent backward rotation of the escapement wheel. The upper edge 36 of said plate is made curved, its center of curvature being substantially in the axis of the dog rocker 19; and the length of this curved upper edge is such that it coöperates with or engages the escapement wheel in all positions of the dog rocker. When the forward arm of said dog rocker is pulled down by the operation of a key, and when said dog rocker moves back to normal position, the plate 31 moves toward the front and back in unison with the dog rocker on which it is mounted but in all positions it continues to engage the wheel. In short, the device 34, 35 constitutes a back-pawl pivoted on the dog rocker and engaging the escapement rack to prevent backward motion thereof, and it so engages the rack in all positions of the dog rocker. When a tooth of the escapement wheel is released by the feed dogs 24, 25 it strokes against the reverse face of the plate 35 and moves the back-pawl toward the left in Fig. 2 until the tooth has passed the pawl, after which said pawl is drawn back to normal position by a restoring spring 37 which is connected at one end to a pin 38 projecting from the dog rocker and at the other end to an ear 39 consisting of a prolongation of one of the arms 34. The motion of the pawl under the impulse of said spring 37 is limited by a suitable shoulder 40 on the dog rocker.

As here shown, the reverse face or edge 41 of each rack tooth is formed on an arc such that when any given tooth is in position to be engaged by the pawl 34, 35, said arc has its center substantially at the pin 26 so that the pawl coöperates properly with the rack teeth.

The improved back-pawl cannot under any circumstances delay the return motion of the dog-rocker as can that of the Barney patent, and it cannot fail to act on account of a too quick operation as can the pawl of my prior patent referred to.

It will of course be understood that the details of construction can be varied.

What I claim as new and desire to secure by Letters Patent, is:—

1. In the carriage feed mechanism of a typewriting machine, the combination of an escapement rack, a dog rocker, dogs on said rocker for controlling the forward feed of said rack, and a separate device on said dog rocker, acting in all positions of said dog rocker to prevent backward motion of said rack.

2. In the carriage feed mechanism of a typewriting machine, the combination of an escapement rack, a dog rocker, dogs on said rocker for controlling the forward feed of said rack, and a separate dog or pawl pivoted to said dog rocker and engaging said rack in all positions of said dog rocker to prevent backward motion of said rack.

3. In the carriage feed mechanism of a typewriting machine, the combination of an escapement rack, a dog rocker, dogs on said rocker for controlling the forward feed of said rack, and a pawl for preventing backward motion of said rack, said pawl pivoted on said dog rocker to swing in the plane in which said rack moves, and said pawl having an elongated engaging face so that it engages the rack in all positions of the dog rocker.

4. In the carriage feed mechanism of a typewriting machine, the combination of an escapement rack, a pivoted dog rocker, dogs on said rocker for controlling the forward feed of said rack, and a pawl on said dog rocker for preventing backward motion of said rack, said pawl having an elongated engaging surface formed on an arc having its center in the pivotal axis of said dog rocker, so that said pawl engages said rack in all positions of said dog rocker.

5. In the carriage feed mechanism of a typewriting machine, the combination of a feed rack, a dog rocker having a stepping dog pivoted thereon and engaging said rack, and a pawl for preventing backward motion of said rack, said pawl pivoted to said dog rocker concentrically with said stepping dog.

6. In the carriage feed mechanism of a typewriting machine, the combination with an escapement comprising a feed rack and means for controlling the forward motion of said feed rack, a pawl for preventing backward motion of said rack, said rack and pawl being mounted for relative motion in a direction transverse to that of the feed motion of said rack at each operation of the escapement, and said pawl being of such width as to engage said rack at all parts of such relative transverse motion.

Signed at Syracuse, in the county of Onondaga, and State of New York, this 14th day of October, A. D. 1910.

HERBERT H. STEELE.

Witnesses:
 HILDA M. PERKINS,
 BESSE G. KITTREL.